United States Patent [19]
Grenon et al.

[11] Patent Number: 5,891,040
[45] Date of Patent: Apr. 6, 1999

[54] METHOD FOR MAINTAINING A CONSTANT VELOCITY TO COLOR MAP IN AN ULTRASOUND FLOW IMAGING SYSTEM

[75] Inventors: Stephen M. Grenon, Manchester, N.H.; Sharon A. Gadonniex, Somerville, Mass.; Richard A. Snyder, Chester, N.H.

[73] Assignee: Hewlett-Packard Company, Palo Alto, Calif.

[21] Appl. No.: 25,350

[22] Filed: Feb. 18, 1998

[51] Int. Cl.[6] ............................................. A61B 8/00
[52] U.S. Cl. ........................... 600/455; 600/453; 600/454
[58] Field of Search .................................. 600/453, 454, 600/455, 441; 343/8, 201; 348/33

[56] References Cited

U.S. PATENT DOCUMENTS

| | | | |
|---|---|---|---|
| 3,883,871 | 5/1975 | Moore | 343/17.2 R |
| 4,794,933 | 1/1989 | Yamazaki | 600/455 |
| 4,799,490 | 1/1989 | Namekawa | 600/455 |
| 4,819,652 | 4/1989 | Micco | 600/455 |
| 5,107,841 | 4/1992 | Sturgill | |
| 5,549,111 | 8/1996 | Wright et al. | 128/742 |
| 5,709,209 | 1/1998 | Friemel et al. | 600/443 |

*Primary Examiner*—Marvin M. Lateef
*Assistant Examiner*—Ali M. Imam

[57] ABSTRACT

The method of the invention employs pulsed Doppler ultrasound signals to color image blood and tissue movement velocities in a body. The method initially images a movement with a transmitted ultrasound signal that manifests a current signal transmission frequency value and a current pulse repetition frequency (PRF) value. Those values exhibit a determined ratio R to each other. Thereafter, in response to an indication by the user that movement is to be imaged at a new depth, the method alters the current transmission frequency to a new frequency to provide improved signal back-scatter from movement at the new depth. Then, the current PRF is adjusted, automatically, to a new PRF value which, when compared to the new transmission frequency, manifests substantially the same determined ratio R that was present between the current transmission frequency and current PRF. The latter step assures that the mapping of movement velocity values to colors is maintained, notwithstanding use of a new transmission frequency.

10 Claims, 2 Drawing Sheets

METHOD FOR MAINTAINING A CONSTANT VELOCITY TO COLOR MAP IN AN ULTRASOUND FLOW IMAGING SYSTEM

FIELD OF THE INVENTION

This invention relates generally to ultrasound color velocity imaging and, more particularly, to a method for imaging blood velocities which maintains, substantially unchanged, a mapping of velocities to color when imaging frequencies are changed.

BACKGROUND OF THE INVENTION

Ultrasound color flow imaging is a widely used modality which enables the clinician to view both venous and arterial blood flows. Color flow images are produced by mapping a color that corresponds to a sensed velocity onto the ultrasound image. When the user of the ultrasound imaging system alters the focal depth of the ultrasound beam to change the position of the focal plane of the ultrasound beam, current state of the art ultrasound systems do not alter the frequency of the transmitted ultrasound signal to assure a maximum backscatter signal. This is because a frequency alteration can change the mapping of flow velocities to color and result in changes in the color presentation, notwithstanding the fact that the imaged flow velocities remain relatively unchanged.

Certain facts are well known about ultrasound system performance;

1. The amount of energy which reflects off tissue and blood increases as the incident ultrasound frequency is increased. Further, the rate of increase of blood backscatter is larger than the rate of increase of tissue backscatter.
2. The ultrasound beam is attenuated as it passes through the body. As beam frequency is increased, the attenuation also increases. Therefore, the amount of energy which actually reaches a given point in the body decreases with an increase in frequency.
3. Known color flow imaging techniques which utilize pulsed Doppler and autocorrelation techniques take into account the pulse repetition frequency (PRF) and the ultrasound transmission frequency in order to estimate blood velocities.

The relationship between blood velocity, PRF and transmission frequency is given as follows:

$$\text{Velocity} \approx \text{PRF/transmission frequency}$$

Depending upon the particular portion of a body to be imaged, the user selects a transducer which is particularly designed to handle the frequencies that are utilized to image the particular body portion. The ultrasound system maintains a table which lists the transmission frequencies for the various transducers. Thus, when a particular transducer is connected to the system, a transmission frequency is determined from the table and is used thereafter to control the transducer. Such frequency assignment enables acquisition of optimum images of the body region of interest.

Upon a change of depth of focus by the user, the ultrasound system automatically alters the frequency applied to the transducer, in accordance with a predetermined mapping of image depth to frequency value. However, prior art systems do not concurrently alter the PRF and the result is an alteration of the color presentation, due to fact that the calculated velocity value is dependent upon both applied frequency and PRF. Accordingly, the velocity color attribute changes even though there is no change in the imaged velocity. This renders it more difficult for the user to assess blood velocities at different depths within the body.

Accordingly, it is desirable to provide a color flow Doppler imaging system wherein the color presentation of flow velocities remain constant, notwithstanding alterations in the depth of the body region being imaged.

SUMMARY OF THE INVENTION

The method of the invention employs pulsed Doppler ultrasound signals to color image tissue and blood flow velocities in a body. The method initially images a movement with a transmitted ultrasound signal that manifests a current signal transmission frequency value and the a current pulse repetition frequency (PRF) value. Those values exhibit a determined ratio R to each other. Thereafter, in response to an indication by the user that movement is to be imaged at a new depth, the method alters the current transmission frequency to a new frequency to provide improved signal back-scatter from movement at the new depth. Then, the current PRF is adjusted, automatically, to a new PRF value which, when compared to the new transmission frequency, manifests substantially the same determined ratio R that was present between the current transmission frequency and current PRF. The latter step assures that the mapping of movement velocity values to colors is maintained, notwithstanding use of a new transmission frequency.

DETAILED DESCRIPTION OF THE PREFERRED EMBODIMENT

Figure 1:
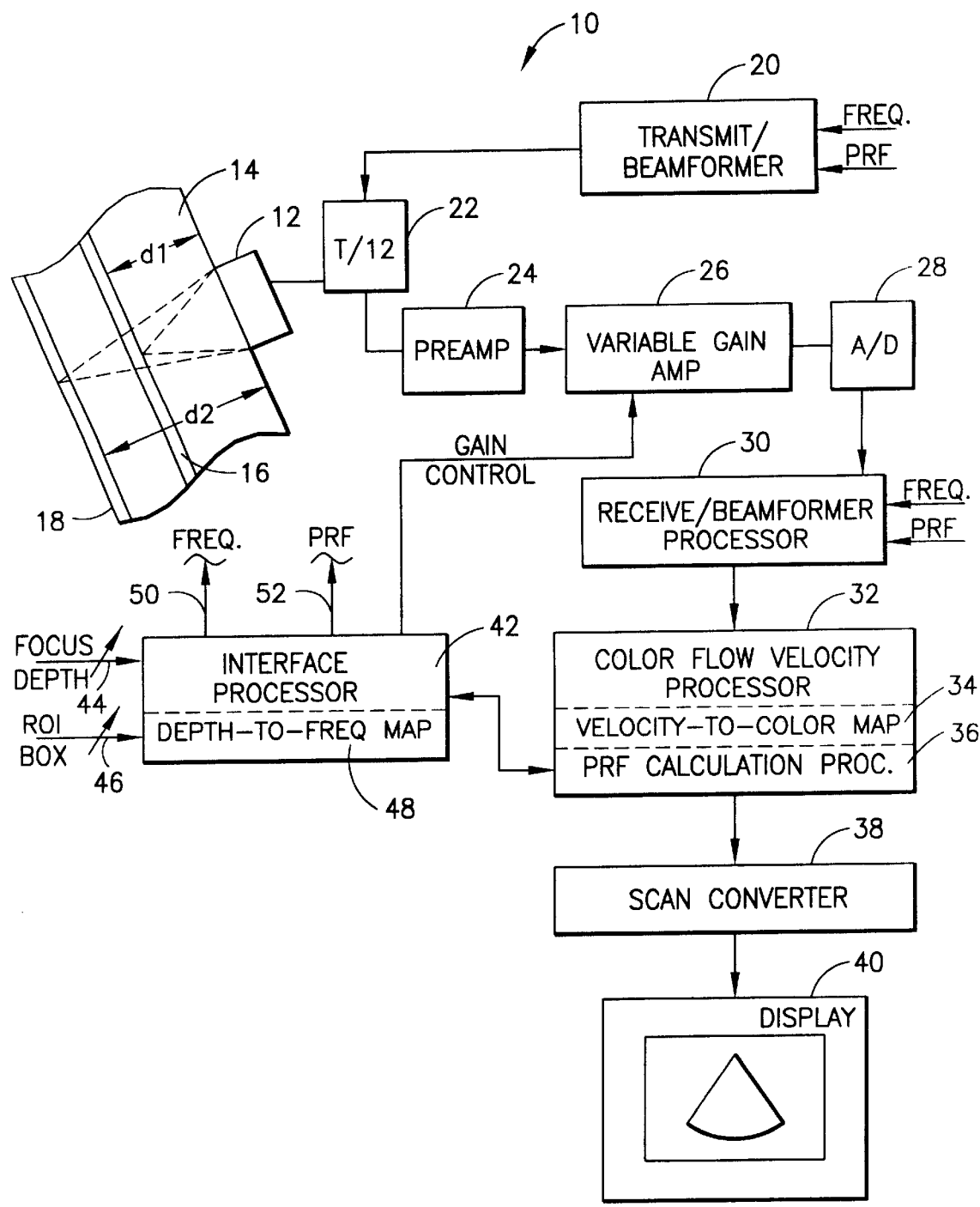
FIG. 1 is a block diagram of a pulse Doppler ultrasound system that is adapted to carry out the invention.

Ultrasound imaging system 10 includes a transducer array 12 which, during each transmission event, produces a burst of ultrasound energy that is directed into a body 14. In accordance with alterations made to the current transmission frequency and PRF, transducer array 12 is enabled to change its focal plane within body 14. Thus, flow in fluid pathways 16 and 18 can be imaged by placing the focal plane at a distance d1 or d2 from transducer array 12. As is known to those skilled in the art, pulsed Doppler ultrasound relies upon phase and/or time changes in the backscatter signal which result from the interaction of the transmitted ultrasound pulses and the fluids moving in pathways 16 and 18.

The pulsed Doppler ultrasound transmission signals are produced in transmission/beamformer module 20 and pass through transmission/receive switch 22 to transducer 12. Received backscatter signals are passed from transducer 12 through transmission/receive switch 22 to a preamplifier 24 and then through a variable gain amplifier 26 to an analog to digital (A/D) converter 28. The digital sample values produced by A/D converter 28 are passed to receiver/beam former processor 30. Therein, frequency and PRF parameter inputs enable receiver/beamformer processor 30 to convert the received digital sample values to coherent ultrasound signal lines that are passed to color flow velocity processor 32.

The complex output of receiver/beamformer processor 30, when passed to color flow velocity processor 32, is processed to enable derivation of the velocities of the fluids passing through an imaged pathway (e.g., 16 and/or 18).

Within color flow velocity processor 32, a velocity-to-color map 34 is accessed which associates particular colors with particular velocities. Thus, for each calculated velocity in an imaged region, use of velocity-to-color map 34 enables a color associated with the calculated velocity to be assigned to the region evidencing the velocity.

Also stored in color flow velocity processor 32 is a PRF calculation procedure 36 which is utilized to alter the PRF when the transmission frequency is changed in response to a change in focal depth. This feature will be described in further detail below. The color flow velocities that are calculated within color flow velocity processor 32 enable colors to be assigned, as aforesaid, to flow fields within the ultrasound image. The combined image/color assignment are then fed to scan converter 38 which converts the image from polar coordinates to a raster scan image which is then passed to a display 40 for presentation to the user.

An interface processor 42 is responsive to user inputs to provide corresponding control signals to the various modules within ultrasound imaging system 10. More specifically, a focus depth input 44 enables the user to alter the focal plane of the transmitted ultrasound beam produced by transducer array 12. A further input control is region of interest (ROI) box input 46 which enables the user to position a box on display 40 which surrounds an area wherein the flow velocities are to be color imaged. The ROI box input 46 and focus depth input 44 are then utilized by interface processor 42 to alter the focal plane of the beam emanating from transducer 12 so as to enable color flow imaging of velocity fields present in the ROI box.

A depth-to-frequency map 48 is accessible by interface processor 42 to enable an ultrasound transmission frequency to be selected which will best image a particular focus depth. Accordingly, when a revised focus depth is input, map 48 enables interface processor 42 to output a frequency control signal 50 which causes an alteration of the ultrasound transmission frequency and informs other modules of the new transmission frequency value. Also, as will be described below, interface processor 42 is enabled to output a PRF control signal 52 which causes an alteration of the PRF of the pulsed Doppler ultrasound signals. That output is used to maintain a constancy of color flow presentation, even when the transmission frequency is changed.

As indicated above, when the ultrasound transmission frequency is increased, the backscatter of all targets increases. However, the amount of increase is dependent on the type of target. In the case of blood flow, backscatter increases more than backscatter from tissue. However, since blood backscatter signals levels are typically much less than tissue backscatter signals, the difference between the blood backscatter signals and tissue backscatter signals decreases. The increase in blood backscatter and decrease in the difference between blood and tissue backscatter causes a desirable decrease in the dynamic range.

The negative aspects which result from the use of a higher transmission frequency are a decrease in signal penetration and a change in velocity scale. The positive aspect, by contrast, is that blood flow signals, which would have fallen below the minimum detectable values of A/D converter 28, no longer do so and the decrease in dynamic range presents less demands upon the A/D conversion process.

As will be recalled, velocity is proportional to the ratio of the PRF to the transmission frequency. However, if the transmission frequency is altered, and the PRF remains unchanged, a different velocity is computed for a given Doppler return, even though no velocity change has occurred. Thus, the invention automatically adjusts the PRF to retain the same or substantially the same ratio to the transmission frequency as previously. The computed velocity value therefore remains unchanged. Given an unchanged velocity value, a prior assigned mapping of velocities to colors will also remain unchanged.

Figure 2:
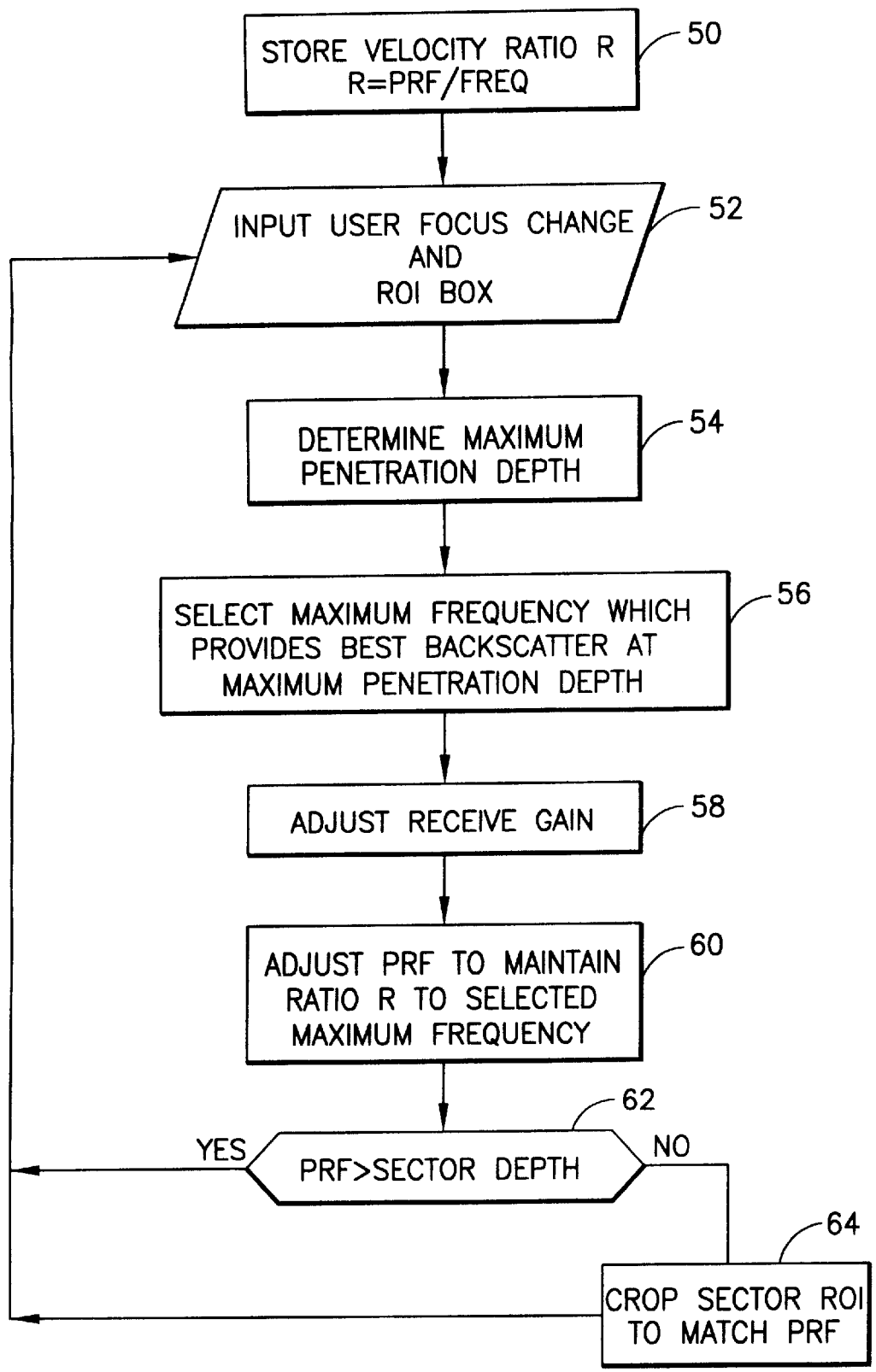
FIG. 2 is a logic flow diagram which illustrates the procedure of the invention.

Turning now to FIG. 2, the method of operation of the invention will be described which enables a constancy of color presentations of flow field velocities. Initially, the system stores a velocity ratio ($R_{max}$) that is equal to the ratio of the current PRF to the current transmission frequency (box 50). Next, in response to a change in focus depth input 44 and/or ROI box input 46 (FIG. 1) (box 52), interface processor 42 determines a maximum required penetration depth required of a transmitted ultrasound signal (box 54). Then, interface processor 42 selects from depth-to-frequency map 48, a maximum frequency which will provide an optimum level of backscatter at the maximum penetration depth (box 56).

Interface processor 42, based upon the selected maximum transmission frequency, now outputs a gain control signal to variable gain amplifier 26. That signal alters the gain of amplifier 26 to compensate for any transmit amplitude changes at the new frequency and/or any received amplitude changes resulting from the new frequency selection (box 58).

To maintain the displayed velocity colors constant, notwithstanding a change in transmission frequency, interface processor 42 automatically alters PRF output control signal 52 to vary the PRF in a manner as to maintain the ratio of PRF to transmission frequency equal to $R_{max}$ (box 60). Accordingly, the adjustment of the PRF value enables the retention of the previous PRF-to-transmission frequency ratio and maintains a constancy of calculated velocity values. The constancy of calculated velocity values assures unchanged color presentations, based on the relationships that are set out in velocity-to-color map 34.

Next, it is determined if the revised PRF value is greater than that required to image the sector depth of the ROI box (decision box 62). If yes, no further adjustments are needed and the process awaits a next adjustment of the focal plane and/or ROI. However, if it is determined that the PRF value is less than that required to image the sector depth (resulting in a limited depth wherein blood flow velocities can be sensed), the sector ROI depth is cropped so that only flows within the cropped sector ROI depth are those which can be subjected to the colorflow imaging procedure at the selected PRF (box 64).

In accordance with the above described invention, ultrasound imaging system 10 is able to automatically adjust the transmission frequency and receive gain to a highest detectable frequency. Such adjustment occurs without changing the color presentations that are displayed with respect to fluid flow velocities in a region being imaged. Further, color to velocity mapping remains unchanged, notwithstanding changes in focal plane depth It should be understood that the foregoing description is only illustrative of the invention. Various alternatives and modifications can be devised by those skilled in the art without departing from the invention. For instance, while the above description has concentrated on measurement of blood flow velocities, the invention is equally applicable to tissue movement velocities. Accordingly, the present invention is intended to embrace all such alternatives, modifications and variances which fall within the scope of the appended claims.

We claim:

1. A method for employing pulsed Doppler ultrasound signals to color image movement velocity in a body, said method comprising the steps of:

a) imaging a movement at a first depth with a transmitted ultrasound signal that manifests a current signal frequency value and a current pulse repetition frequency (prf) value, said current prf value and current signal frequency value exhibiting a determined ratio to each other;

b) reacting to an indication of a new depth wherein movement is to be imaged, by altering said current signal frequency value to a new frequency value which enables improved signal backscatter from said movement at said new depth; and c) automatically adjusting said current prf value to a new prf value which substantially maintains said determined ratio with said new frequency value.

2. The method as recited in claim 1, wherein step a) causes a display of movement velocities in colors which map to distinct velocity of movement values, and adjusting step c) assures that the map of velocity of movement values to colors is maintained, notwithstanding said new frequency.

3. The method as recited in claim 1, wherein step a) utilizes said determined ratio to find a velocity v through use of the relationship:

$$v \approx prf/frequency.$$

4. The method as recited in claim 1, wherein step b) selects said new frequency value based upon a maximum depth at which said movement is to be imaged.

5. The method as recited in claim 4, comprising the further step of:

d) adjusting a gain value to which backscatter signals at said new frequency value from said maximum depth are subjected, to assure an ability to process backscatter signals from said maximum depth.

6. A pulsed Doppler ultrasound system for color imaging movement velocities in a body, said system comprising:

a) ultrasound means for imaging a movement at a first depth using a transmitted ultrasound signal that manifests a current signal frequency value and a current pulse repetition frequency (prf) value, said current prf value and current signal frequency value exhibiting a determined ratio R;

b) processor means responsive to an indication of a new depth wherein movement is to be imaged, for controlling said ultrasound means to adjust automatically:

(i) said current signal frequency value output by said ultrasound means to a new frequency value which enables improved signal backscatter from said movement at said new depth, said processor means; and (ii) said current prf value to a new prf value which substantially maintains said determined ratio R with said new frequency value.

7. The system as recited in claim 6, wherein said ultrasound means a) causes a display of movement velocities in colors which map to distinct movement velocity values, and said processor means b) assures that the map of velocity of movement values to colors is maintained, notwithstanding said new frequency value.

8. The system as recited in claim 6, wherein said ultrasound means a) utilizes said determined ratio R to find a velocity v through use of the relationship:

$$v \approx prf/frequency.$$

9. The system as recited in claim 6, wherein said processor means b) selects said new frequency value based upon a maximum depth at which said movement is to be imaged.

10. The system as recited in claim 6, wherein said processor means b) further controls said ultrasound means to automatically adjust:

(iii) a gain value to which backscatter signals at said new frequency value from said maximum depth are subjected, to assure an ability to process backscatter signals from said maximum depth.

* * * * *